US008872800B2

(12) United States Patent
Nowatzyk et al.

(10) Patent No.: US 8,872,800 B2
(45) Date of Patent: Oct. 28, 2014

(54) OPTICAL TABLET STYLUS AND INDOOR NAVIGATION SYSTEM

(75) Inventors: Andreas G. Nowatzyk, San Jose, CA (US); Charles P. Thacker, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 254 days.

(21) Appl. No.: 13/287,147

(22) Filed: Nov. 2, 2011

(65) Prior Publication Data

US 2013/0106782 A1 May 2, 2013

(51) Int. Cl.
*G06F 3/042* (2006.01)
*G06F 3/0354* (2013.01)
*G06F 3/03* (2006.01)

(52) U.S. Cl.
CPC .......... *G06F 3/0325* (2013.01); *G06F 3/03545* (2013.01)
USPC ....................................... 345/175

(58) Field of Classification Search
None
See application file for complete search history.

(56) References Cited

U.S. PATENT DOCUMENTS

| | | | |
|---|---|---|---|
| 4,558,313 A | 12/1985 | Garwin et al. | |
| 5,831,601 A * | 11/1998 | Vogeley et al. | 345/175 |
| 6,078,876 A | 6/2000 | Rosenberg et al. | |
| 7,646,377 B2 | 1/2010 | Geaghan | |
| 2004/0169644 A1 | 9/2004 | Xu et al. | |
| 2005/0122319 A1 | 6/2005 | Sakurai et al. | |
| 2006/0028457 A1 | 2/2006 | Burns | |
| 2007/0046654 A1 | 3/2007 | Tomiya | |
| 2007/0285405 A1 | 12/2007 | Rehm | |
| 2010/0095206 A1 | 4/2010 | Kim | |
| 2010/0260533 A1* | 10/2010 | Lin | 401/195 |
| 2011/0018799 A1 | 1/2011 | Lin | |

FOREIGN PATENT DOCUMENTS

JP 2008217179 A 9/2008

OTHER PUBLICATIONS

Rosa, et al., "VisualPen: A Physical Interface for natural Human-computer interaction", Retrieved at <<http://www-alt.medien.ifi.lmu.de/en/events/pi03/papers/larosa.pdf>>, Physical Interaction (PI03) Workshop on Real World User Interfaces, Sep. 8, 2003, pp. 22-26.
"Emitters and Detectors for Infrared (IR) Touchscreens", Retrieved at <<http://catalog.osram-os.com/catalogue/catalogue.do;jsessionid=65188E61489416374EDDEB75865F5EA3?act=downloadFile&favOid=02000004000123960002000b6>>, Aug. 13, 2010, pp. 14.
Nowatzyk, et al., "Electromagnetic 3D Stylus", 13171324, Filed Date: Jun. 28, 2011, pp. 63.
"International Search Report", Mailed Date: Mar. 14, 2013, Application No. PCT/US2012/063129, Filed Date: Nov. 2, 2012, pp. 11.

* cited by examiner

*Primary Examiner* — David D Davis
(74) *Attorney, Agent, or Firm* — Micah Goldsmith; Glen Johnson; Micky Minhas

(57) ABSTRACT

Optical user input technology comprises three-dimensional (3D) input sensors and 3D location emitters to enable high-precision input in a 3D space, and the 3D location emitter may be a stylus or other writing or pointing device. Certain implementations may comprise an orientation assembly for transmitting orientation of the 3D location emitter in addition to location within a 3D space, and some implementations may also use selectively identifiable signaling from the 3D location emitters to the 3D input sensors to distinguish one 3D location emitter from another, to transmit data other data from a 3D location emitter to a 3D location sensor, or as a means of providing orientation information for the 3D location emitter with respect to the 3D location sensor. Also disclosed are position fixing, indoor navigation, and other complementary applications using 3D input sensors and/or 3D location emitters.

16 Claims, 7 Drawing Sheets

OPTICAL TABLET STYLUS AND INDOOR NAVIGATION SYSTEM

BACKGROUND

Many mobile computing devices, both small and large, utilize a touchscreen interface instead of a traditional keyboard as a primary means of user input. However, typical touchscreen interfaces alone generally lack the precision necessary to capture detailed drawings and/or writings such as cursive handwriting, annotations, sketches, or other detailed or nonstandard graphical input. To enable richer higher-fidelity user input, a stylus (or other writing-type device) may be utilized to improve the precision of a touchscreen interface for such mobile computing devices. A stylus can be readily used with a resistive touchscreen interface, an electrostatic (or capacitive) touchscreen interface, or an electromagnetic touchscreen interface.

However, current touchscreen interfaces—used alone or in combination with a stylus—lack the ability to enable three-dimensional (3D) user input. Consequently, traditional touchscreens are unable to support 3D interaction for purposes of playing 3D video games, using 3D computer aided design (CAD) programs, complementing other 3D user interfaces, or manipulating volumetric images such as medical imagery derived from MRI and CAT scans, among many other potential utilizations. Moreover, existing two-dimensional (2D) touchscreen user interfaces employ technologies that are unable to support broader utilizations for the provision of complementary mobile device applications such as position fixing and indoor navigation.

SUMMARY

Various implementations disclosed herein are directed to optical user input technology comprising one or more 3D position sensors and one or more 3D location emitters to enable high-precision user input in a 3D space. For several implementations, the 3D input sensors may be oriented with respect to a specific input/output plane such as a 2D or 3D slate-type display device of a mobile computing device ("slate"). These implementations may also comprise the use of one or more 3D location emitters that, for certain implementations, may be arranged on a stylus or other writing-type device or pointing device. Such implementations are thereby able to determine both location and orientation of the 3D location emitters within the 3D space using selectively identifiable (e.g., relatively unique) signaling from the 3D location emitters to the 3D position sensors to distinguish one 3D location emitter from another. Moreover, this digital signaling may also be used to transmit additional data from the 3D location emitter to a 3D position sensor, including the known location of that 3D location emitter.

Several implementations disclosed herein are also directed to user input devices utilizing one or more 3D location emitters in conjunction with one or more 3D position sensors. Certain such implementations are further directed to user input devices that can be added to a display device at some point after original manufacture of that display device. In addition, various implementations disclosed herein are directed to indoor navigation and other complementary applications that may utilize one or more 3D input sensors, one or more 3D location emitters, and/or other complementary device components, as well as interaction between other similarly capable mobile computing devices.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
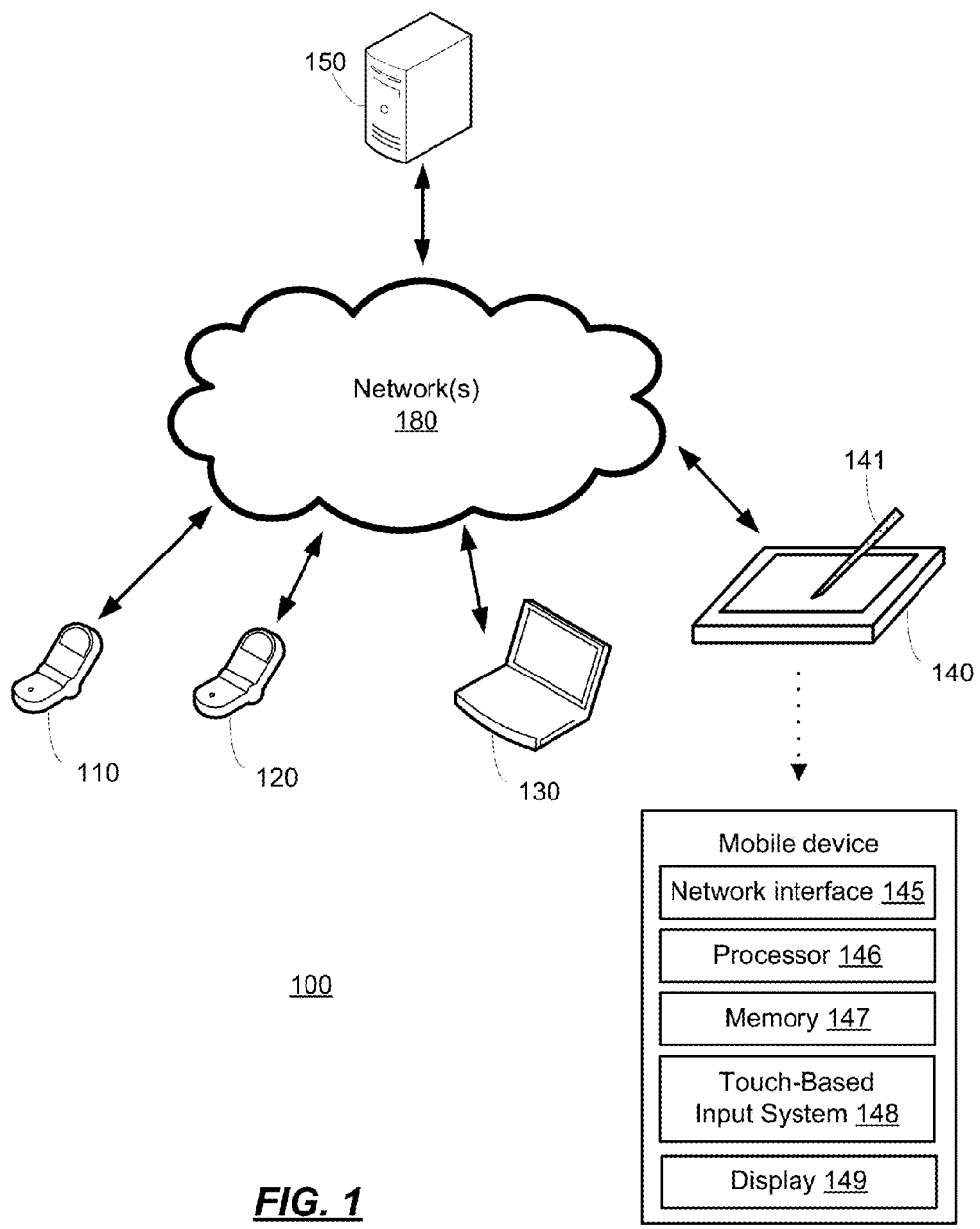
FIG. 1 is an illustration of an exemplary networked computer environment in which the numerous implementations disclosed herein may be utilized.

FIG. 1 is an illustration of an exemplary networked computer environment 100 in which numerous implementations disclosed herein may be utilized. The networked computing environment 100 includes a plurality of computing devices interconnected through one or more networks 180. The one or more networks 180 allow a particular computing device to connect to and communicate with another computing device. The depicted computing devices include mobile devices 110, 120, and 140, laptop computer 130, and application server 150.

Figure 8:
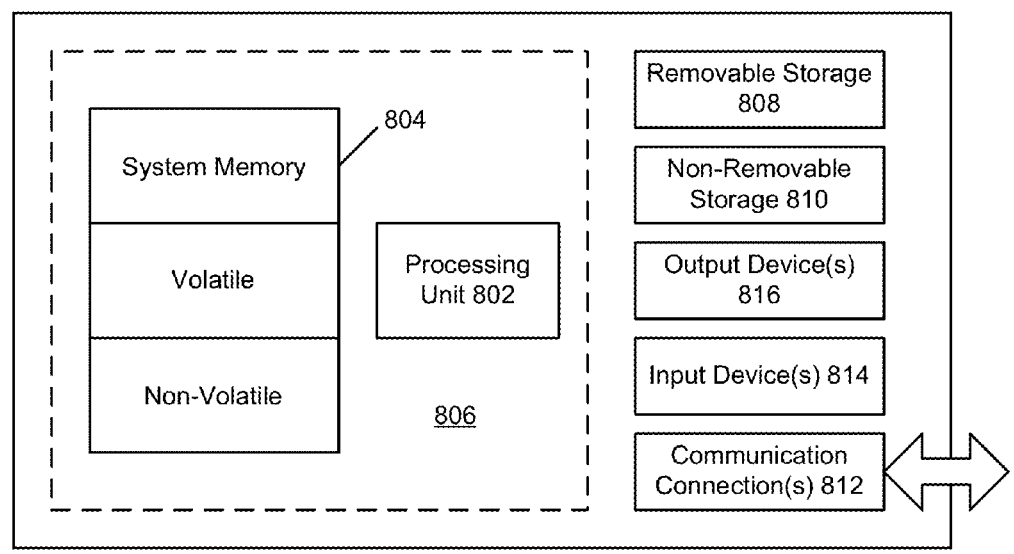
FIG. 8 shows an exemplary computing environment.

In some implementations, the computing devices may include a desktop personal computer, workstation, laptop, net-top, tablet computer, PDA, cell phone, smart phone, or any WAP-enabled device or any other computing device capable of interfacing directly or indirectly with the network 180, such as a computing device 800 illustrated in FIG. 8. Each of the computing devices may run an HTTP client (e.g., a web-browsing program) or a WAP-enabled browser in the case of a cell phone, tablet computer, PDA, or other wireless device or the like, allowing a user of the computing device to access information available to it at the server 150 or to provide information to the server 150. Other applications may also be used by the computing devices to access or provide information to the server 150, for example. In some implementations, the server 150 may be implemented using one or more general purpose computing systems such as the computing device 800 illustrated in FIG. 8. Although only one server 150 is shown, this is not meant to be limiting and multiple servers may be implemented.

In some implementations, the computing devices may include other computing devices not shown. In some implementations, the computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

The networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

One implementation of mobile device 140 includes a touch-based input system 148 (shown here as a stylus system), a display 149, a network interface 145, a processor 146, and a memory 147, all in communication with each other. The display 149 may display digital images and/or videos. The display 149 may include a touchscreen user interface. The touch-based input system 148 may determine the position and orientation of a touch-based input device, such as a stylus 141, in relation to a surface of the display 149. The network interface 145 allows the mobile device 140 to connect to one or more networks 180. The network interface 145 may include a wireless network interface, a modem, and/or a wired network interface. The processor 146 allows the mobile device 140 to execute computer readable instructions stored in the memory 147 in order to perform processes discussed herein.

Touch-type input devices were originally developed for use as digitizers on non-displaying surfaces, but were subsequently adapted for utilization with specialized display devices in order to enable a user to interact directly with the output displayed on such display devices (rather than indirectly using a mouse, keyboard, or similar input devices). The most common touch-type input devices are a finger, stylus, or writing instrument, and the term "stylus" used herein is intended to encompass a broad array of touch-type input devices without limitation. To achieve position resolution, precision, and speed, touch-type input devices (or "stylus system," as used herein) generally comprise display devices having a resistive, electrostatic, or electromagnetic touchscreen.

A resistive touchscreen is one that detects changes in resistance occurring between the stylus and the touchscreen, and thus senses the location where a stylus makes contact with the surface of the touchscreen. A resistive touchscreen panel comprises a solid but flexible surface (e.g., an output display) overlaying a pair of thin flexible layers separated by a narrow gap. These two layers comprise electrically conductive horizontal and vertical lines, respectively, to form intersections corresponding to precise locations directly beneath the surface. When a touch-type input device (e.g., a stylus) applies pressure (i.e., presses down) on a point on the touchscreen surface, the two electrically conductive layers make contact beneath this touchpoint and thus enable the location of the touch to be determined.

An electrostatic (or "capacitive") touchscreen is one that detects changes in capacitance occurring between an electrically-conductive touch-type input device and the touchscreen. The electrostatic touchscreen senses where a touch-type input device has made contact with (or has come very close to) the surface of the touchscreen. Typically, an electrostatic touchscreen uses the capacitive coupling between electrically conducting transparent traces presented on the front of the display in order to sense the touch-type input device.

Electromagnetic touchscreens, however, are the most commonly used touchscreens today and are often implemented using a two-dimensional (2D) sensor array built in closely behind the display panel. A mesh of horizontal and vertical wire loops that make up the 2D sensor array are used to detect the position of the touch-type input device—specifically, a special stylus—through electromagnetic coupling between the sequentially activated loops in the sensor array and a resonant inductor/capacitor (LC) circuit located in the stylus. Moreover, while physical spacing of the wire loops (sometimes referred to as a "loop antennae array") precludes any single wire loop from alone providing adequate resolution for position determination, the wire loops collectively provide stable reference measurements to the stylus which can then be used to interpolate an actual position to 0.1 mm accuracy in both the X and Y direction at an update rate of 133 samples per second.

However, one shortcoming of an electromagnetic touchscreen is that the 2D sensor array (comprising the wire loops) must be built directly into the touchscreen, and thus it cannot be added later to a standard display device. Standard displays are also difficult to convert into resistive and electrostatic touchscreens. Moreover, none of these devices support full 3D input and are largely limited to 2D input utilization.

In contrast, various implementations disclosed herein use a fundamentally different approach based on optical user input technology. More specifically, various implementations disclosed herein are directed to an optical 3D tracking system operating in conjunction with a 2D or 3D display device to receive input in a 3D space from a touch-type input device. For these various implementations, the position of a touch-type input device (e.g., a stylus) is detected using a 3D position sensor system that covers a large volume of space in front of the display device. For several such implementations, the 3D position sensor system may comprise (a) two or more 2D position sensors operating together from known relative positions to derive the 3D location and orientation of the detected stylus, and (b) at least one 3D location emitter having one or more position emitters. For certain such implementations, the 2D position sensors may comprise position sensitive diodes (PSDs), and the position emitters may comprise one or more infrared light-emitting diodes (IR-LEDs).

For several implementations, the optical user input technology comprises one or more 3D position sensors and one or more 3D location emitters. Similarly, a touch-based input device (such as a stylus) used for various such implementations may comprise a 3D location emitter, embedded with the stylus, having three or more IR-LEDs to permit both location and orientation determinations.

In certain implementations, the optical 3D tracking system may also capture the attitude (or orientation) of the stylus (in addition to its position) in order to provide at least one supplemental user input based on the specific orientation (including changes in orientation), that is, to enable richer interaction (i.e., more than just "touch") with the display device, both when operating in 3D mode and even when operating in a 2D mode. For example, rotating the stylus might provide control of the paintbrush orientation in a graphical application, or might provide direct control of line thickness to mimic an edged-thickness characteristic of a calligraphy pen when used in a graphic-based writing or drawing application.

Figure 2:
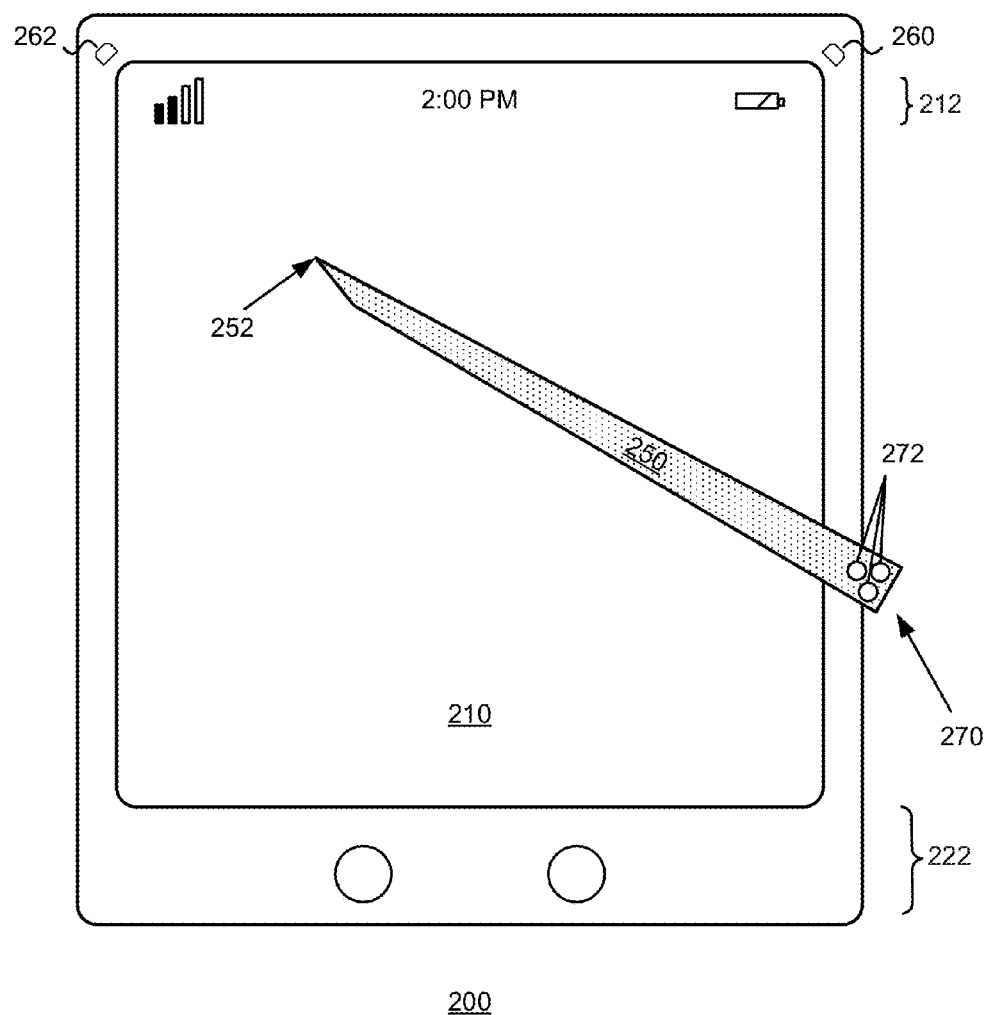
FIG. 2 depicts an exemplary computing device utilizing an optical 3D tracking system representative of several implementations disclosed herein.

FIG. 2 depicts an exemplary computing device 200, such as mobile computing device 140 of FIG. 1, utilizing an optical 3D tracking system representative of several implementations disclosed herein. The computing device 200 may be mobile or non-mobile, and the technology described herein may be applied to both mobile and non-mobile computing devices. Computing device 200 includes a display device 210 and physical control buttons 222. For certain implementations, the display device 210 may comprise a touchscreen, while in alternative implementations the display device might be replaced with a non-display surface. The display device 210 includes a status area 212 which provides information regarding signal strength, time, and battery life associated with the computing device 200.

A touch-type input device such as a stylus 250 may be utilized to provide input information to computing device 200 either by directly touching display device 210 with the stylus tip 252 or positioning the stylus 250 above the surface of display device 210. The exemplary computing device 200 may further comprise two or more 2D position sensors 260 and 262. For certain implementations, each 2D position sensor 260 and 262 may further comprise position sensitive diodes (PSD) positioned in the focal plane of a wide angle lens to provide, for example, a 120 degree semi-conic volume of 3D space above (or over) the display device 210, whereby the volumes of each PSD largely overlap the 3D space above the display device. Likewise, the stylus 250 for various such implementations may comprise one or more IR-LEDs 272 that together constituting the position emitter 270.

PSDs are able to sense the incidence angle of light that is emitted from IR-LEDs, such as IR-LEDs mounted on a stylus in a fixed and predetermined arrangement, or IR-LEDs used as stationary or dynamic reference beacons (discussed further herein). With regard to a stylus featuring an arrangement of IR-LEDs (known to the computing device), the relative position of each IR-LED can be determined via triangulation when its light is observed from at least two PSD sensors. Moreover, since the relative location of any pair of IR-LEDs on the stylus is known to the computing device, measuring the position of any three or more IR-LEDs on the stylus body makes it possible to compute both the position and orientation of the stylus itself, including the stylus tip which defines the specific point of space intended as input. Since some IR-LED emitters may be obscured at any given time (e.g., by the fingers of the user holding the stylus), various stylus implementations may use more than three IR-LEDs to increase the probability that at least three of its IR-LEDs are unobscured and observable by the PSD sensors at any given time.

PSDs are analog devices that have very high resolution limited only by the precision with which electrical current can be measured. As such, PSD sensors have a demonstrated resolution of approximately 1 part in 1,000,000. Furthermore, PSDs do not require that the measured light be perfectly focused; instead, PSDs only require that the light from an emitter completely fall within the bounds of the sensing surface. Moreover, PSDs are fast, making position acquisitions in excess of 10,000 samples per second possible. Additionally, PSDs are fairly simple devices which can be produced cost-effectively in high volumes. For various implementations described herein, the PSD sensors may be positioned in the focal plane of a wide angle lens to provide, for example, a 120 degree conic volume of 3D space for detecting IR-LED signals.

Figure 3A:
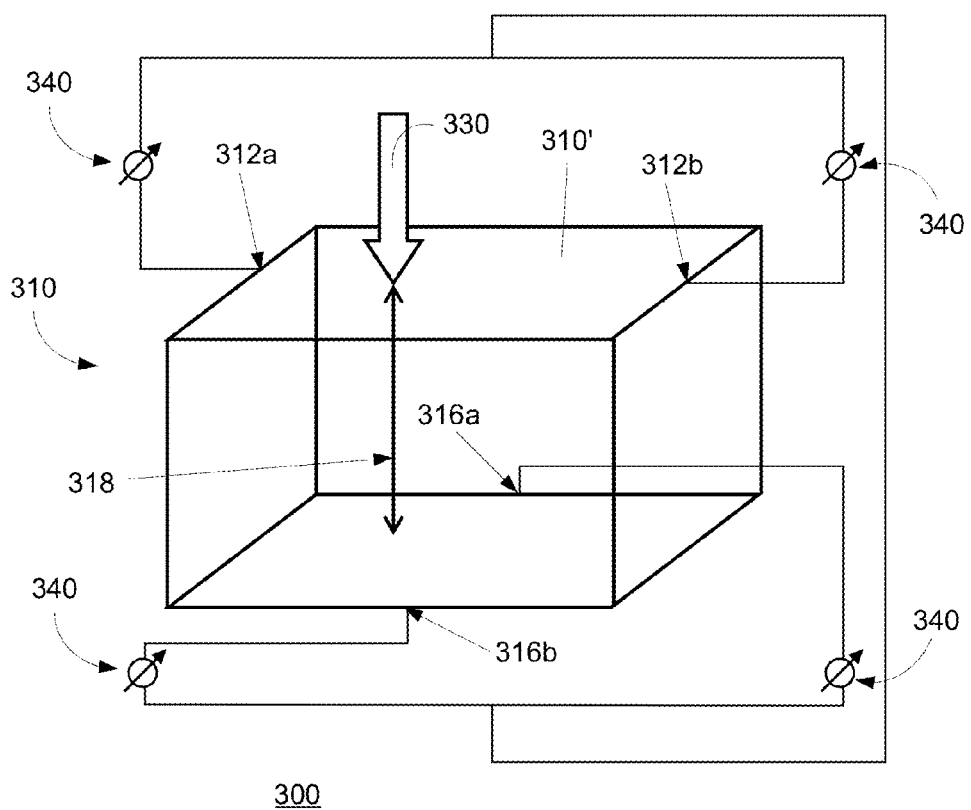
FIG. 3A is a perspective-view hybrid block and electrical diagram illustrating the operation of an exemplary position sensitive diode (PSD) that may be used in an optical 3D tracking system representative of several implementations disclosed herein.
Figure 3B:
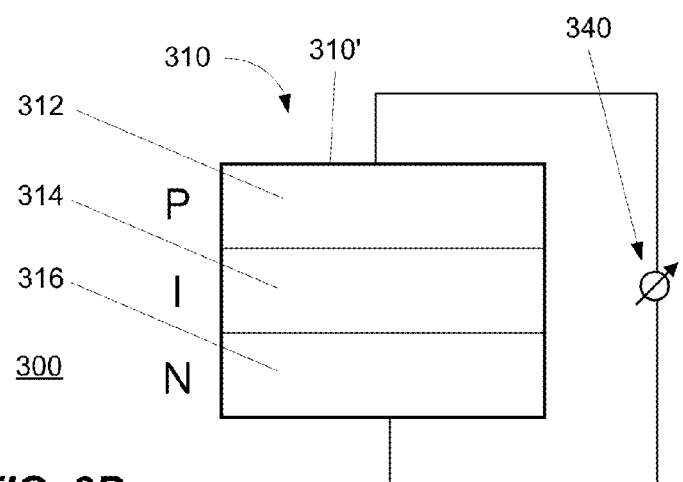
FIG. 3B is a side-view hybrid block and electrical diagram of FIG. 3A.

FIG. 3A is a perspective-view hybrid block and electrical diagram illustrating the operation of an exemplary PSD 300 that may be used in an optical 3D tracking system representative of several implementations disclosed herein, and FIG. 3B is a side-view hybrid block and electrical diagram of FIG. 3A. In the figures, the PSD (shown here as a linear PSD such as one developed by OSI Optoelectronics AS of Norway) comprises a silicon photodetector PIN diode ("photodiode") 310 featuring a heavily-doped p-type semiconductor "cathode" 312 (annotated "P" for positive), a wide lightly-doped near-intrinsic semiconductor ("intrinsic region") 314 (annotated "I" for intrinsic), and an heavily-doped n-type semiconductor "anode" 316 (annotated "N" for negative). The cathode 312 and anode 316 each have two contacts 312a, 312b and 316a, 316b respectively that cover opposing sides of the photodiode 310 as illustrated. In this configuration, the specific resistance (or ratio of photocurrent) between the four contacts 312a, 312b, 316a, and 316b changes based on the position of a light 330 focused on the surface 310' of the photodiode 310 causing electrical flow 318 from the cathode 312 to the anode 316 and distributed which can be as measured by an arrangement of ohmmeters 340 for example. By measuring the ratio of the photocurrent distributed amongst the arrangement of ohmmeters 340, it is possible to determine the centroid of the light spot on the sensor surface.

Some implementations disclosed herein may adopt an approach that enables the PSD sensors to acquire the position of each IR-LED emitter sequentially by having one IR-LED at a time emit its light. Several other implementations, however, may utilize an alternative approach—based on, for example, direct sequence spread spectrum signals to simultaneously sense the position of multiple IR-LED emitters—where all IR-LEDs concurrently emit light each using a different uniquely identifiable encoded sequence that enables the digital signal of each IR-LED to be discernable from each other by the PSD sensors (which are known to be extremely linear devices). This type of spread spectrum detection of the PSD sensors also provides the benefit of filtering out any ambient IR light that reaches the sensor (since it will lack any uniquely identifiable encoded quality). Moreover, the PSD sensors for various such implementations may comprise a filter to prevent non-IR light from reaching the photodiode.

In view of the foregoing, certain implementations disclosed herein are directed to a 3D touch-type input system for a mobile computing device, the system at least comprising: (a) three IR location emitters in a first known configuration fixedly coupled to a touch-type input device for emitting three identifiable IR signals; (b) two position sensors fixedly coupled to the mobile computing device in a second known configuration for sensing the three identifiable IR signals emitted from the three IR location emitters, wherein the sensing comprises determining the two 2D directions for each of the three IR location emitters relative to each of the two position sensors based on the three identifiable IR signals (for a total of six 2D directions, two for each of the IR location emitters); and (c) a processor for determining the position and orientation of the touch-type input device relative to the mobile computing device using the (e.g., six) 2D directions, the first known configuration, and the second known configuration.

Figure 4A:
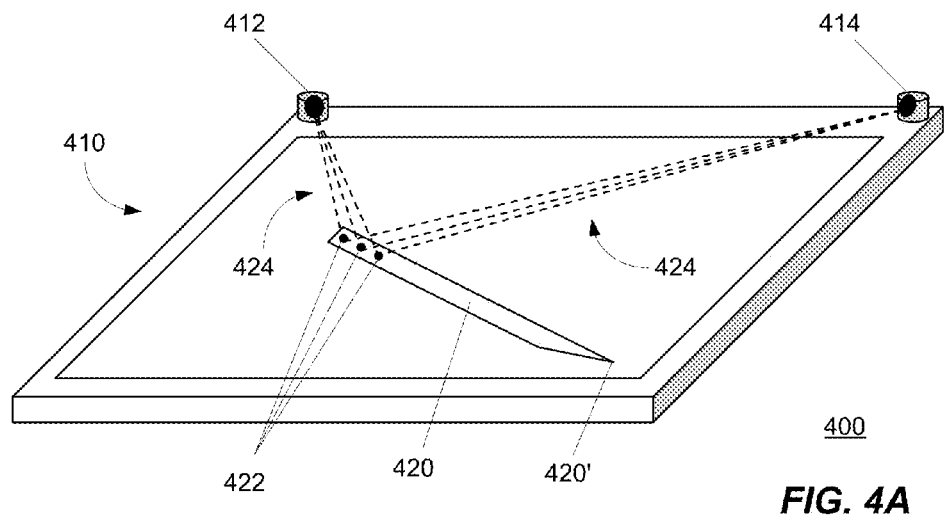
FIG. 4A is a perspective view of an exemplary mobile computing device comprising an optical 3D tracking system representative of several implementations described herein.
Figure 4B:
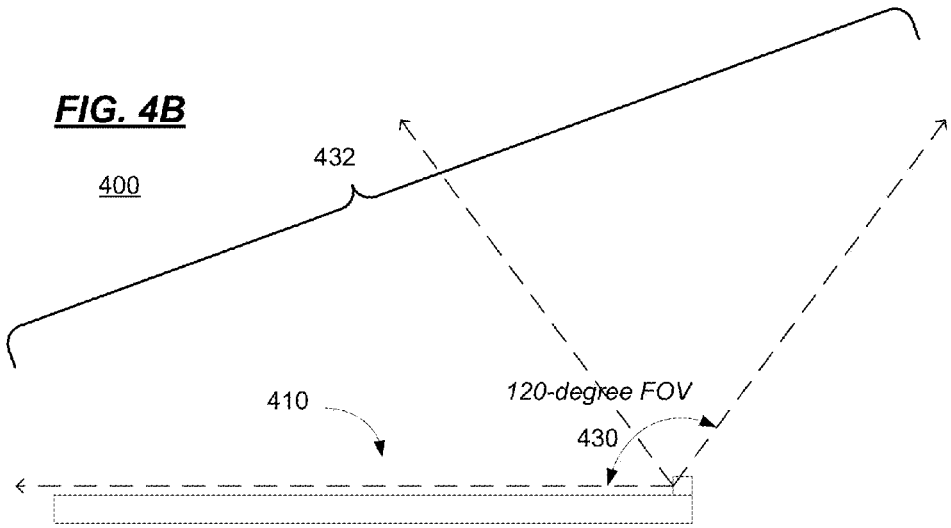
FIG. 4B is a side view of the exemplary mobile computing device illustrated in FIG. 4A.

FIG. 4A is a perspective view of an exemplary mobile computing device comprising an optical 3D tracking system 400 representative of several implementations described herein. FIG. 4B is a side view of the exemplary mobile computing device illustrated in FIG. 4A. In the figures, a display device in the form of a slate 410 comprises two PSD sensors 412 and 414 configured to receive spread spectrum signals 424 (illustrated in FIG. 4A using dashed lines) from a plurality of IR-LEDs 422 mounted on a pointing/writing device, here a stylus 420 (and its tip 420') that is utilized in conjunction with the slate 410.

As illustrated, the PSD sensors 412 and 414 may be mounted in proximity to two corners of the slate (e.g., the display device of a tablet computer). Moreover, as illustrated in FIG. 4B, the wide angle lens of each PSD sensor, such as PSD sensor 412, may be positioned so that its field of view 430 (here illustrated as the dashed lines forming a 120 degree angle) covers a 3D volume of space 432 in front of the surface of the slate 410.

For several such implementations, the spread spectrum digital signals 424 emitted by the IR-LEDs 422 and received by the PSD sensors 412 and 414 may be processed by one or more digital signal processors (DSPs) (not shown) that determine the relative angle of each such IR-LED 422 within its field of view 430 (i.e., unobstructed and detected). This information is used to triangulate the position of each IR-LED and, based on the relative locations of at least three such IR-LEDs 422 at any given moment, the location and orientation of the stylus 420 and its tip 420' can be determined. In other words, the stylus position and orientation may be calculated based on the sensed emitter positions based on their known arrangement relative to the stylus geometry. The optical 3D tracking system 400 provides resolution and precision sufficient for accurately detecting inputs from the stylus 420 for example (or other touch-type input device).

In effect, the two PSD sensors 412 and 414 provide the slate 410 with something comparable to stereovision where the slight difference in perspective in sensing the three IR-LEDs 422—measured as horizontal and vertical angles of the signals 424 that in turn define a direction from each PSD sensor 412 and 414 to each IR-LED 422, and thus six directions total for this particular example—enables a geometric determination of location and orientation of those IR-LEDs 422 with respect to the defined plane of the display device (or slate).

In some implementations a conventional PSD-based position sensor might be used to sequentially acquire the direction to each light emitter such that each IR-LED is serially lit and the PSD determine one-at-a-time the position each IR-LED in sequence and continuously repeating the cycle for the IR-LED array. However, for various other implementations two or more IR-LEDs in the array may emit concurrently and utilize a sequencer that enables each IR-LED to emit its own identifiable pattern, that is, where each IR-LED emits a relatively-unique pattern. For example, a 512 bit pseudo-random bit sequence may be assigned to each IR-LED that runs a rate of 250 Kb/sec. This, in turn, permits a linear PSD sensor to receive a mixed signal from the co-emitting IR-LEDs and then isolate the relatively-unique signal from each emitter based on the processing gain in the context of the direct sequence spread spectrum transmission that it receives from the IR-LED array. Thus, such implementations comprise a spread spectrum solution which has the advantage of being relatively immune to uncorrelated signals while tracking each emitter concurrently (rather than time-sequentially).

For several implementations, the arrangement of IR-LEDs (or "IR-LED array") may be battery powered. For the various implementations that use a stylus with an arrangement of IR-LEDs where the stylus (that is, the IR-LEDs) is battery powered, such implementations may further include an in-use detection means, such as a touch sensor, that can detect when the stylus is being utilized and that can conserve battery power when the stylus is not being utilized by, for example, entering a low-power mode and turning off the IR-LEDs.

While the stylus may use a battery for its IR-LEDs, the total required power is expected to be lower than that of an optical mouse and thus indicates the potential for a long battery life. Indeed, unlike an optical mouse for example, the IR-LED emissions do not need to be reflected from a surface with unknown albedo, but instead are intended to be directly received by the corresponding PSD sensors. Thus, for several such implementations, the IR-LED output power may be very low if the emitted light when collected uses PSD sensors having an acceptable aperture (e.g., having a 120 degree minimum aperture in at least one direction). This, in turn, prevents the need for excessive light emission from the IR-LEDs that might otherwise degrade PSD sensor performance by inadvertently illuminating nearby objects (such as the finger of the user holding the stylus in which the IR-LEDs are arranged) which may result in a false signal being detected by a PSD sensor.

In addition, certain implementations may modulate the emitted light of the IR-LEDs to provide the stylus with a low-rate wireless digital communication channel to the slate (e.g., a tablet computer) which can be used to transmit additional information such as button press events, position of a code wheel or linear slider, tip surface contact pressure data, battery status, and so forth.

An additional benefit of various implementations of the optical 3D tracking system described herein—and specifically the use of the PSDs and IR-LEDs—is its suitability for also providing indoor navigation features (or "position/location awareness"). More specifically, the PSD sensors may be used to sense the position of the tablet with respect to the room it is operating in using supplemental IR-LEDs in stationary positions or in a position relatively fixed with respect to the PSD sensors.

For example, for certain implementations, the PSD sensors comprising the optical 3D tracking system could also be used to sense infrared signaling emitting from fixed IR-LED beacons in the vicinity of the device within, for example, a room, hallway, automobile, or other such enclosed location. These beacons could advertise their position and other auxiliary information over the infrared signal which the computing device may use to compute the position and attitude of the device for a variety of purposes such as indoor position locating, navigation, etc. Because of the high precision of the sensing system, absolute slate position and attitude (with sub-centimeter precision) within the enclosed location may be achieved. In addition, reference beacon might be static (to provide a fixed point of reference) or dynamic (to provide a relative point of reference). For certain implements, the reference beacons may advertise their position and other auxiliary information over their emitted infrared signal.

As such, certain implementations disclosed herein are directed to a system for optical navigation of a mobile computing device, the system at least comprising: (a) two position sensors fixedly coupled to the mobile computing device in a known configuration for sensing three identifiable infrared (IR) signals emitted from three IR location emitters with known locations, wherein the sensing comprises determining the 2D directions for each of the three IR location emitters (e.g., two 2D directions for each IR location emitter) relative to each of the two position sensors based on the three identifiable IR signals; and (b) a processor for determining the position and orientation of the mobile computing device relative to the three IR location emitters using the (e.g., six) 2D directions, the known configuration of the two position sensors, and the known locations of the three IR location emitters.

Figure 5:
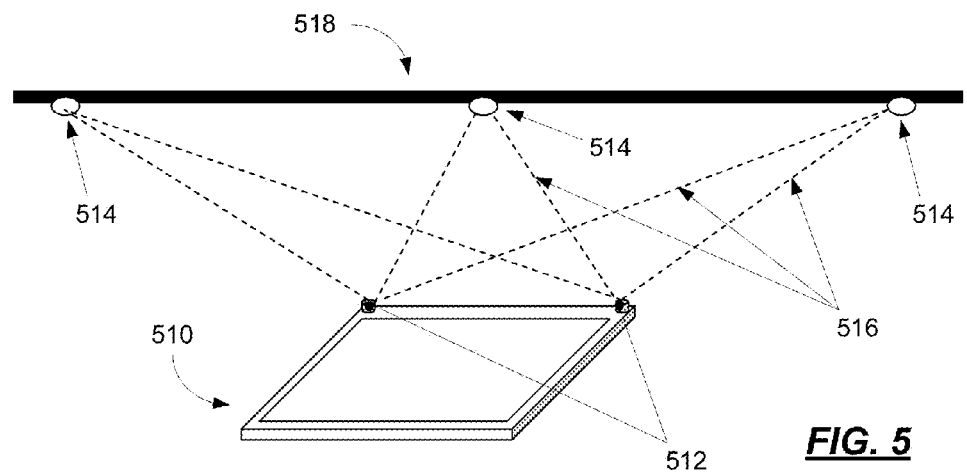
FIG. 5 illustrates an exemplary use of PSD sensors and stationary IR-LED beacons for indoor navigation representative of several implementations disclosed herein.

FIG. 5 illustrates an exemplary use of PSD sensors 512 and stationary IR-LED beacons 514 for indoor navigation representative of several implementations disclosed herein. Each stationary beacon 514 comprises at least one IR-LED that emits a spreading sequence digital signal 516 (illustrated with dashed lines) receivable by the PSD sensors 512 and decodable by the DSP (not shown) in the associated mobile computing device 510, for example, a tablet computer. In certain implementations, each stationary beacon 514—which might be mounted to the ceiling 518 of a room, for example—may transmit its relatively unique identity and its known location by modulating its IR-LED's infrared emission with a secondary encoding. In certain alternative implementations, the known locations of each beacon (and possibly other additional information) might instead be published via a locally accessible communications system (e.g., a Wi-Fi system covering the area) receivable by the computing device 510. By receiving signals from three or more stationary beacons 514, the computing device 510 can compute its position and orientation (e.g., attitude) based on the known location of the detectable stationary beacons 514.

Once again, two PSD sensors 512 provide the mobile computing device 510 with something comparable to stereovision where the slight difference in perspective in sensing the three beacons 514—measured as horizontal and vertical angles of the signals 516 that in turn define a direction from each PSD sensor to each IR-LED beacon 514, and thus six directions total for this particular example—enables a geometric determination of the location of the mobile computing device 510 and its orientation relative to the IR-LED beacons 514 with respect to the defined plane of its display device (or slate).

In addition, certain implementations disclosed herein are directed to a system for relative optical positioning, the system for each mobile computing device at least comprising: (a) two position sensors fixedly coupled to the mobile computing device in a known configuration for sensing a plurality of identifiable IR signals emitting from a plurality of IR sources in a 3D space, wherein the sensing comprises determining for each identifiable IR signal two 2D directions for the corresponding IR signal source relative to each of the two position sensors; (b) an IR laser emitter fixedly coupled to the first mobile computing device in a first known orientation for emitting an identifiable IR laser that, when reflected and dispersed by an intervening obstacle at a point of impact in the 3D space, produces an identifiable IR signal emanating from the point of impact that can be sensed by the two position sensors, wherein the emitted IR laser is modulated to provide a digital communication channel from the mobile computing device to other mobile computing devices; and (c) a processor for estimating the position of the mobile computing device relative to the IR source from the point of impact based on the two 2D directions, the known configuration of the two position sensors, and the known location and known emission direction for the IR laser.

For several implementations the IR laser emitter may be modulated with dedicated code sequences similar to IR-LEDs disclosed earlier herein. In addition, various implementations may utilize a low-power IR-laser in compliance with, for example, Occupational Safety and Health Administration (OSHA) regulations pertaining to invisible laser emissions, because of their increased risk to human eyes as such unseen emissions do not trigger the blink-reflex that protect the human eye from a conventional laser pointer. For a low-power IR-laser, certain implementations may ensure that the laser emission is unconditionally eye-safe by limiting the emission to 1 micro-watt within the pupil aperture of an eye.

Figure 6:
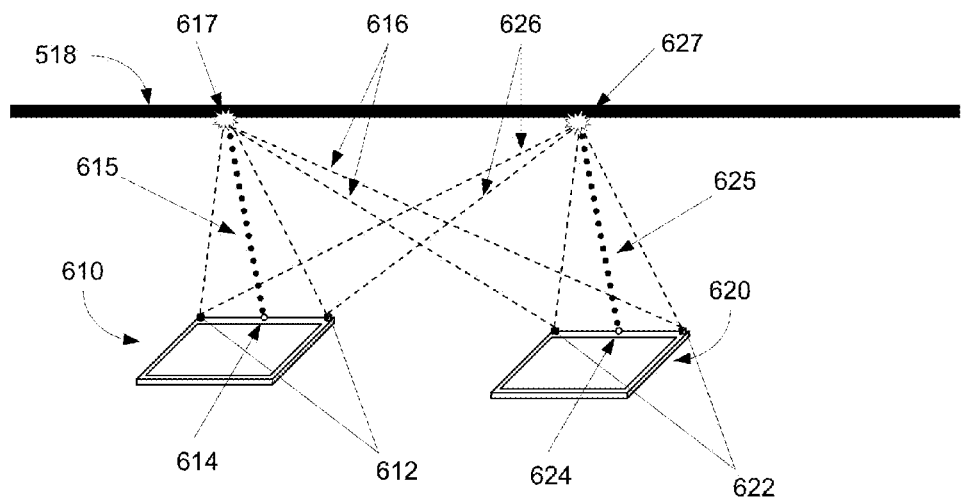
FIG. 6 illustrates an exemplary use of PSD sensors and a dynamic beacon for indoor navigation representative of several implementations disclosed herein.

FIG. 6 illustrates an exemplary use of PSD sensors 612 and a dynamic beacon 614 for indoor navigation representative of several implementations disclosed herein, including the system described above. A first computing device 610 may comprise at least one dynamic beacon 614 in addition to its set of PSD sensors 612. The dynamic beacon 614, which may be implemented as an infrared laser pointer, might emit a modulated infrared signal 615 (shown as a dotted line) having a relatively unique spread spectrum sequence. The signal 615 is then reflected and dispersed as a reflected signal 616 (shown as dashed lines) at the point where it hits a surface 617 and is thus detectable by the PSD sensors of the beacons 614.

Since the dynamic beacon 614 emits its infrared laser signal 616 from a precisely known position, direction, and angle relative to the PSD sensors of the beacons 614, the computing device 610, using its PSD sensors, can determine the intercept points of the infrared laser emissions (e.g. signal 616) with, for example, the walls (not shown) or ceiling 518 of the room in which it is located. This information may be used to deduce the position and/or attitude of the computing device to some extent based on various assumptions about the architecture of the room surrounding the computing device (e.g., the ceiling is horizontally level, the walls are vertical, etc.). In any event, since the direction of the emission is known to the computing device, only a single PSD sensor may be used to determine the location of where the laser beam impacts a reflecting surface.

In addition, when the first computing device 610 is able to interact with one or more additional computing devices that are similarly configured—such as a second computing device 620 comprising PSD sensor 622 and a dynamic beacon 624 emitting its own modulated infrared signal 625 (shown as a dotted line), its reflection/dispersion 626 (shown as dashed lines) at the point where it hits a surface 627—then each computing device 610 and 620 can determine its possible relative position with respect to the other computing devices with which it can now communicate via the infrared signaling. More specifically, by sharing this laser impact location information, a set of computing devices can determine the relative locations with respect to each other with only 3 commonly visible laser impacts detectable by each computing device (and not necessarily the same laser impacts).

Indoor navigation enables a number of new applications for the computing device including, for example, acquiring pictures at different locations and orientations relative to the beacons (stationary or dynamic) that, in turn, may support image integration, 3D reconstruction, 3D modeling, mapping, and other uses. It is also possible to support interactive user interfaces (UIs) between multiple mobile devices and their peripherals such that the stylus of a first computing device might interact with and a stationary screen and a projected image emanating from a peripheral projection display device (either the first computing device or a second computing device in communication with the first computing device). These UIs may also include special gesture inputs such as, for example, pointing to parts on a live presentation projected onto large, stationary screen and adding annotations.

Mobile computing devices equipped with active beacon projectors also enable applications that can capture the precise floor plan of buildings by moving through the open space with the slate uncovered and in an active recording state. Similarly, such devices could be used to capture the precise 3D shape of large objects, like sculptures, cars, etc., for 3D modeling, 3D CAD, or other purposes.

Additional inter-device capabilities may also include selective sending of messages from one computing device to another. For example, these computing devices 610 and 620 could establish an ad-hoc coordinate system where a projector might be used (that is, interacted with) by all participating computing devices insofar as pointing out information or permitting additional annotations to the projected image—transforming the projected image into a shared, interactive working surface. Similarly, these location features may be used for interactive gaming, 3D modeling, and several other applications.

In yet other implementations, the position and attitude of two devices relative to two or more reference beacons may be used to enable one device to directly interact with output displayed by the other device, and vice versa. For example, a stylus from a first device may be pointed at the projection display of a second device (i.e., on a projection screen in a known fixed location relative to the reference beacons and, thus, the two devices) and interact directly with the projection display through the second device.

In particular, this includes the ability to exchange position and attitude information with similarly equipped computing devices which in turn enables new forms of user interfaces. For example, pointing a mobile computing device to another unit may be used as a gesture to establish communication between these devices and these devices alone.

Figure 7A:
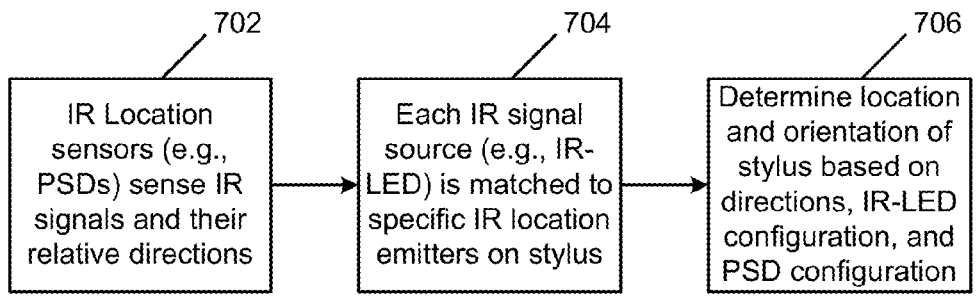
FIG. 7A is a process flow diagram illustrating an exemplary process for determining the location and orientation of a touch-type input device utilized with various implementations disclosed herein.

FIG. 7A is a process flow diagram illustrating an exemplary process 700 for determining the location and orientation of a touch-type input device utilized with various implementations disclosed herein. At 702, a mobile computing device senses a plurality of IR signals using the IR position sensors, and a 2D direction for each IR signal is determined for each IR position sensor. At 704, the source (e.g., the specific IR-LED on the touch-type input device) for each IR signal is identified—that is, each IR signal source (e.g., IR-LED) is matched to specific IR location emitters on stylus, the configuration of which is already known to the mobile computing device (or, alternately, may be is transmitted by the stylus as modulated data on each IR signal). At 706, the location and orientation of the touch-based input device is determined based on the derived directions for the IR signals and the known configurations of both the IR position sensors (and the differences in their readings) and the IR location emitters (that originated those IR signals).

Figure 7B:
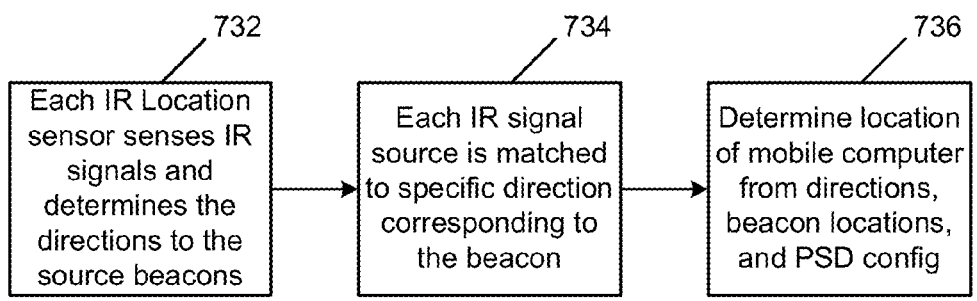
FIG. 7B is a process flow diagram illustrating an exemplary process for mobile computing device beacon navigation (i.e., determining location using beacons) representative of various implementations disclosed herein.

FIG. 7B is a process flow diagram illustrating an exemplary process 730 for mobile computing device beacon navigation (i.e., determining location using beacons) representative of various implementations disclosed herein. At 732, a mobile communication device senses IR location emissions (using the two IR position sensors) from at least three beacons (each an IR position sensor), and a 2D direction for each IR signal (for each beacon) is determined for each IR position sensor. At 734, each IR signal source is matched to its location—in some implementations by lookup of known beacons, while in other implementations this information may be encoded (modulated) into the IR signal itself—and these locations are matched to the relative directions determined by each IR position sensor. At 736, the location and orientation of the mobile computing device is determined relative to beacons based on the derived directions for the IR signals and the known configuration of the IR position sensors (and the differences in their readings) and the known locations of the beacons (that originated the IR signals).

Figure 7C:
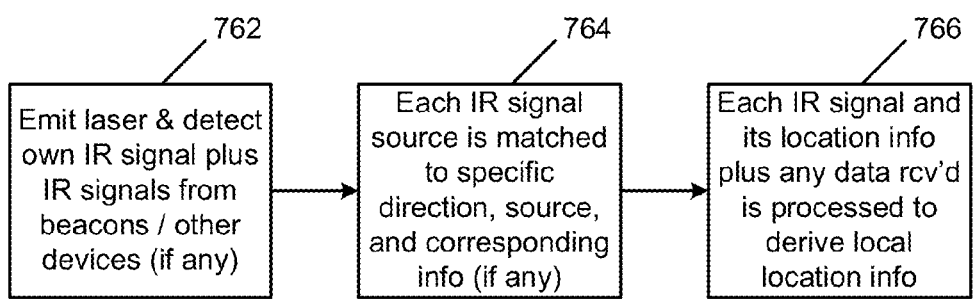
FIG. 7C is a process flow diagram illustrating an exemplary process for mobile computing device laser positioning (i.e., deriving relative local navigation/location information) representative of various implementations disclosed herein.

FIG. 7C is a process flow diagram illustrating an exemplary process 760 for mobile computing device laser positioning (i.e., deriving relative local navigation/location information) representative of various implementations disclosed herein. At 762, the mobile communication device emits a laser—e.g., from an IR laser device having a known location and orientation with regard to its IR position detector—that upon impact with an intervening object produces a dispersion of its own IR signal that it senses with its IR position detectors, along with any other IR signals that might be emitted by beacons and/or by other similarly capable mobile computing devices. At 764, the sensed IR signals are matched to their respective source including laser impact points (corresponding to the location where the laser hits an intervening object), beacons (which may transmit their location information and other data encoded (i.e., modulated)) in their IR signals, and from other mobile computing devices from the IR signals stemming from their laser impact points. Each mobile computing device encodes (modulates) its location information relative to its laser impact point in the continuing beam of its laser, and may also use the modulated laser as a communication medium with other mobile devices. At 766, each IR signal, its direction (as determined by each IR position sensor), and any corresponding location information (such as that provided by other computing devices or beacons) are processed to derive local location info relative to the IR signals received.

FIG. 8 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A three-dimensional (3D) touch-type input system for a computing device, the system comprising:
   three infrared (IR) emitters fixedly coupled to an input device for emitting three IR signals;
   two position sensors fixedly coupled to the computing device configured to receive the three IR signals emitted from the three IR emitters, each of the two position sensors configured to sense two two-dimensional (2D) directions for each of the three IR signals emitted from the input device, the two position sensors combinedly sensing six 2D directions; and
   a processor configured to use the six 2D directions sensed by the two position sensors to determine at least one of an orientation of the input device, or a 3D position of a tip of the input device in a volume of space above a major surface of the computing device.

2. The system of claim 1, wherein the IR signals are modulated to provide a digital communication channel from the touch-type input device to the mobile communication device.

3. The system of claim 1, wherein each of the two position sensors comprises a position sensitive diode having an anode and a cathode, each of the anode and the cathode having two contacts, to combinedly provide for four contacts arranged on two pairs of opposing sides of a respective one of the two position sensors, the four contacts configured to accommodate sensing of photocurrents indicative of a centroid of light incident on a surface of the respective one of the two position sensors.

4. The system of claim 1, further comprising a wide angle lens that provides a focal plane in the volume of space above the major surface of the computing device, wherein at least one of the two position sensors is coupled to the wide angle lens.

5. The system of claim 1, wherein the input device is a stylus-type device.

6. The system of claim 1, wherein the touch-type input device is separate from the mobile computing device, is battery powered, and comprises a power saving feature for when the touch-type input device is not in use.

7. The system of claim 1, wherein:
   the two position sensors sense three infrared beacon signals emitted from three IR beacons, wherein the sensing comprises determining the two 2D directions for each of the three IR beacons relative to each of the two position sensors based on the three IR beacon signals, and wherein the sensing comprises demodulating the IR beacon signals to receive location data for each of the three IR beacons; and the processor determines the position and orientation of the mobile computing device relative to the three IR beacons based on the 2D directions, the known configuration of the two position sensors, and the known locations of the three IR beacons.

8. The system of claim 1, wherein the computing device comprises one of a mobile computing device or a non-mobile computing device.

9. The system of claim 1, wherein the major surface of the computing device comprises one of a non-display surface or a touchscreen.

10. The system of claim 9, wherein the processor is further configured to use the six 2D directions sensed by the two position sensors to determine a position of the tip of the input device when the tip is in contact with the one of a non-display surface or a touchscreen.

11. The system of claim 1, wherein the processor is further configured to use the six 2D directions sensed by the two position sensors to determine a change in orientation of the input device.

12. A system for optical navigation of a computing device, the system comprising:

two position sensors configured to receive three infrared (IR) signals emitted from three IR emitters, each of the two position sensors configured to sense two two-dimensional (2D) directions for each of the three IR signals, the two position sensors combinedly sensing six 2D directions; and a processor configured to use the six 2D directions sensed by the two position sensors to determine relative to the three IR emitters, at least one of an orientation of the computing device, or a three-dimensional (3D) position of the computing device.

13. The system of claim 12, wherein the IR signals are modulated to provide a digital communication channel from the IR location emitters to the mobile communication device.

14. The system of claim 12, wherein location information is derived from the digital communication channel.

15. The system of claim 12, wherein each of the two position sensors comprises a position sensitive diode having an anode and a cathode, each of the anode and the cathode having two contacts, and providing four contacts that are arranged on four sides of a respective one of the two position sensors, the four contacts configured to accommodate sensing of photocurrents indicative of a centroid of light that is incident on a surface of the respective one of the two position sensors.

16. The system of claim 12, wherein the processor is further configured to use the six 2D directions sensed by the two position sensors to determine a change in orientation of the computing device with reference to the three IR emitters.

* * * * *